United States Patent
Dougan

[15] 3,655,402
[45] Apr. 11, 1972

[54] COMBINED FOOD PASTRY AND FILLING
[72] Inventor: Ernest V. Dougan, Anaheim, Calif.
[73] Assignee: Hunt-Wesson Foods, Inc.
[22] Filed: Nov. 3, 1969
[21] Appl. No.: 873,474

[52] U.S. Cl. ................................99/86, 99/88, 99/192 BB
[51] Int. Cl. ....................................................A21d 13/00
[58] Field of Search..................99/86, 88, 92, 192 BB, 172

[56] References Cited
UNITED STATES PATENTS
3,338,722  8/1967  Long..........................................99/172
3,144,340  8/1964  Powers...................................99/172 X Primary Examiner—Raymond N. Jones
Assistant Examiner—James R. Hoffman
Attorney—Fowler, Knobbe & Martens

[57] ABSTRACT

A frozen unbaked pastry dough in an annular configuration having a bottom surrounding a frozen filling encased in an open bottomed metal cylinder which, upon baking, forms a patty shell with raised sides for containing the filling after removal of the cylinder, is described, along with a process for preparing the frozen and baked products.

14 Claims, 7 Drawing Figures

PATENTED APR 11 1972 3,655,402

INVENTOR.
ERNEST V. DOUGAN
BY
FOWLER, KNOBBE
& MARTENS
ATTORNEYS.

INVENTOR.
ERNEST V. DOUGAN

BY
FOWLER, KNOBBE
& MARTENS
ATTORNEYS.

INVENTOR.
ERNEST V. DOUGAN
BY
FOWLER, KNOBBE
& MARTENS
ATTORNEYS.

COMBINED FOOD PASTRY AND FILLING

This invention relates to prepared foods and more particularly to frozen pastry suitable for being baked. Still more specifically, this invention relates to a frozen pastry in a patty shell form in which the filling and the pastry dough are prepared separately and combined for handling and baking.

Frozen pies suitable for shipping, storage, and handling before baking are well known in the art. Fruit pies and meat pies of many descriptions are commonly available in food markets. Conventionally, the pastry shell and filling are combined for storage and cooking. With certain types of pastries, this approach may be satisfactory. Many pastries, including the popular "puff pastry," however, do not produce crusts which are satisfactorily flaky, crisp and tender when the filling is cooked in contact with the crust. The moisture from the filling is absorbed by the crust during baking. This not only makes the crust tough and soggy but prevents the crust from rising properly. This latter consideration is particularly important in the case of puff pastry crusts. The present invention permits the simultaneous cooking of the filling and the crust without these difficulties.

Another approach which has been used is to package the filling and the crust separately. In this embodiment, the crust is baked separately and the pie filling is added subsequently. This procedure permits the preparation of baked foodstuffs having crusts with desirable crispness, flakiness, and other desirable characteristics, but is both time consuming and inconvenient. The present invention obviates the difficulties inherent in both of the approaches described by providing a process for preparing a baked food product and a frozen product suitable for baking in which the pastry dough and filling are baked simultaneously but wherein the pastry dough is separated from the filling during baking. The purpose of the invention, therefore, is to provide an improved food product and process.

According to this invention, a frozen or otherwise solidified pie or food filling is encased in a heat resistant cyclinder having an open bottom. A thin metal such as a can or aluminum foil is preferred for the cylinder construction. A pastry dough in the form of an annulus which has a bottom is provided. The dough and the filling may be frozen and packaged together for shipment, handling, storage and marketing. The consumer simply places the pastry dough in an oven at suitable baking temperatures with the encased cylinder of filling centered with the open bottom down in the annular configuration of the pastry dough. Upon baking, the pastry dough rises to form a patty shell. The baking of the crust wall is thus completed substantially out of contact with the filling. A crisp, flaky crust is thereby obtainable. When the baking is complete, the cylinder is easily lifted out of the crust permitting the filling to completely fill the patty shell for serving. The main feature of this invention is an improved food product and a process for preparing same.

One of the purposes of this invention is to provide an unbaked pastry dough suitable for handling, storage and marketing in combination with a canned frozen cylinder of filling wherein the filling is baked in the pastry in the can for stabilizing the pastry during baking.

The article of manufacture described which comprises a frozen pastry dough, a frozen filling and a cylinder encasing the filling is also a specific feature of the invention.

Other purposes and features of the invention with respect to the article of manufacture of this invention and the process for preparing and baking the same will appear from the specification which follows and from the drawing to which reference is now made.

FIG. 1 is a perspective view of the frozen, unbaked patty shell and filling, and FIG. 2 is a side view in partial cross-section of the frozen pastry dough of FIG. 1 showing the configuration and construction in greater detail;

FIG. 3 is a cross-sectional view of the article of manufacture of the invention of FIGS. 1 and 2, following baking; and FIG. 4 is a perspective view of the end product of the invention as illustrated in FIGS. 1, 2, and 3, ready to be served.

FIG. 5 is a perspective view of the frozen, unbaked patty shell and filling container which comprises the article of manufacture of the invention; and FIG. 6 is a perspective view of the same embodiment of the invention following baking but with the filling container still in position;

FIG. 7 illustrates the product of the invention with the filling container removed, ready to be served.

Figure 1:
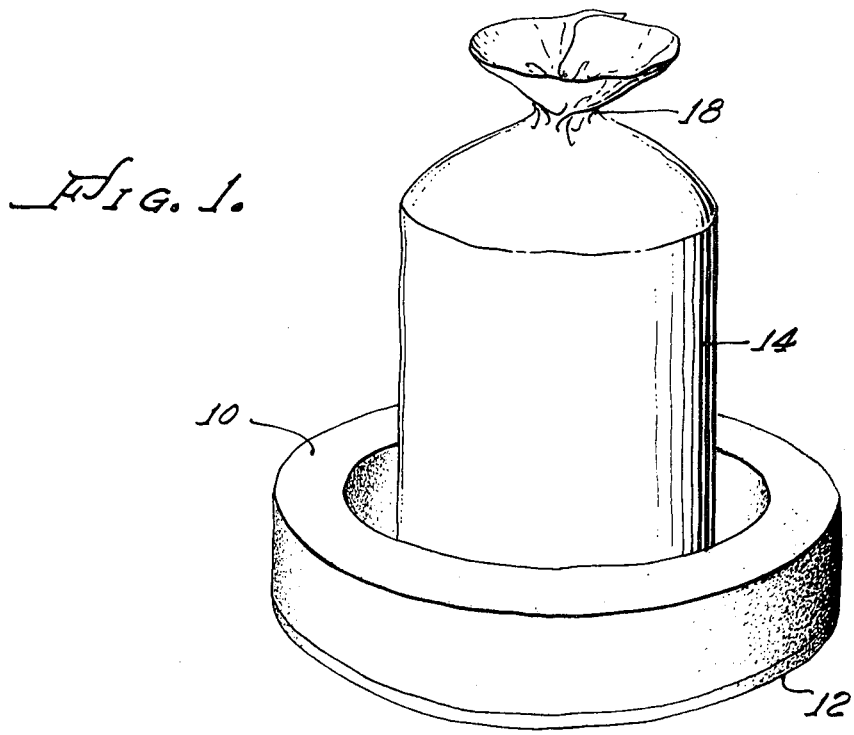
FIGS. 1 through 4 illustrate the article and the process of this invention.
Figure 2:
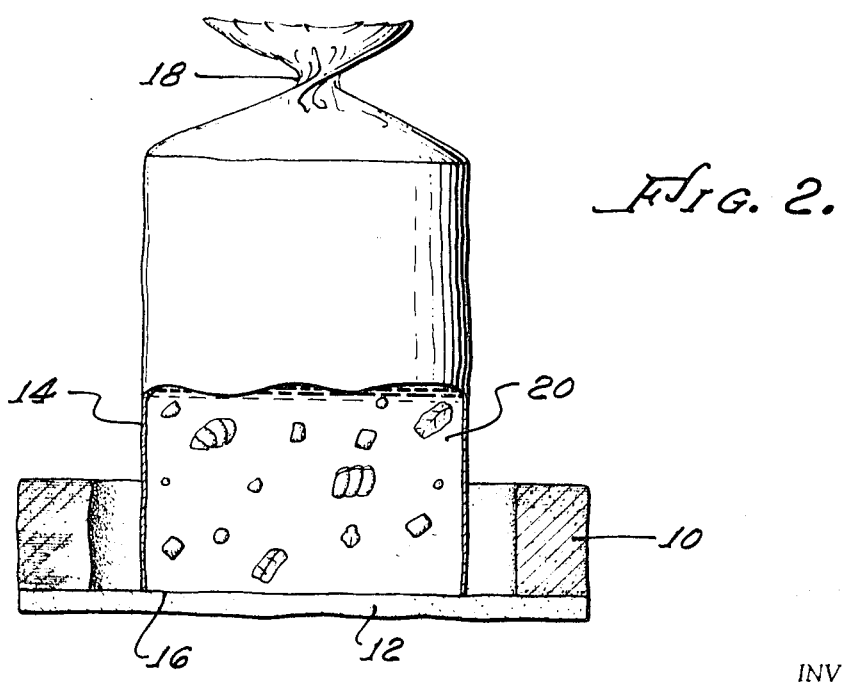

For convenience in understanding the invention, reference is made first to FIGS. 1 and 2 of the drawing, with the understanding that the drawing is merely exemplary of the invention and thus should not be considered as being limitive thereof.

The frozen pastry dough which forms a feature of this invention, shown in FIGS. 1 and 2 as being suitable for baking, comprises a patty shell made of puff pastry dough in the configuration of an annulus 10 having a bottom 12 such that, upon being baked, the bottom 12 forms the bottom crust of the finished food product and the annular portion 10 rises and forms a crisp wall crust for the final baked product of the process of this invention. Located proximate the center of the annulus 10 is a cylinder 14 which preferably has an open bottom, as shown at 16, and which may include a closed top, such as the twisted foil closure 18 with a small opening to allow steam to escape during baking. The cylinder encases a frozen or otherwise solidified filling shown at 20.

Figure 3:
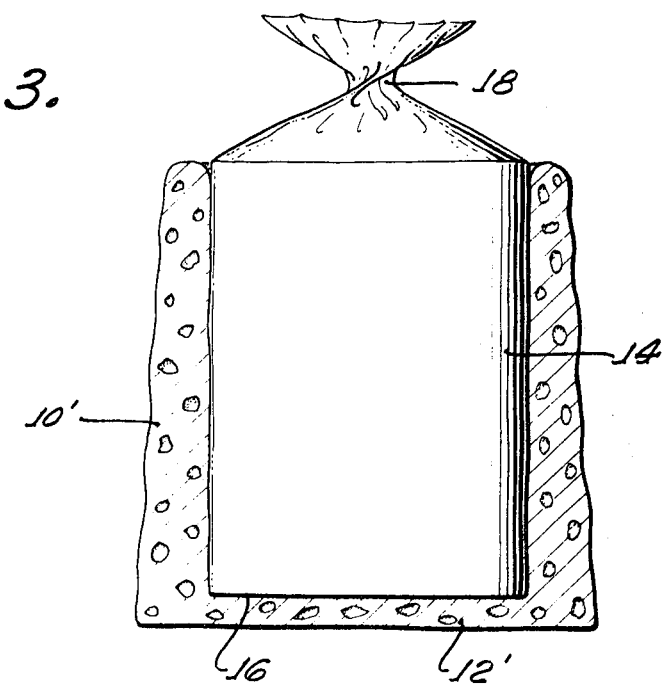

FIG. 3 illustrates the configuration of the invention upon being baked, the baked annulus, forming the side crust of the patty shell being shown at 10' and the bottom crust being shown at 12'. As a result of the baking, the filling 20 is substantially in fluid form. In the usual product, the filling when hot comprises a liquid which may have particles or chunks of meat, fish, vegetable, fruit, etc., therein.

Figure 4:
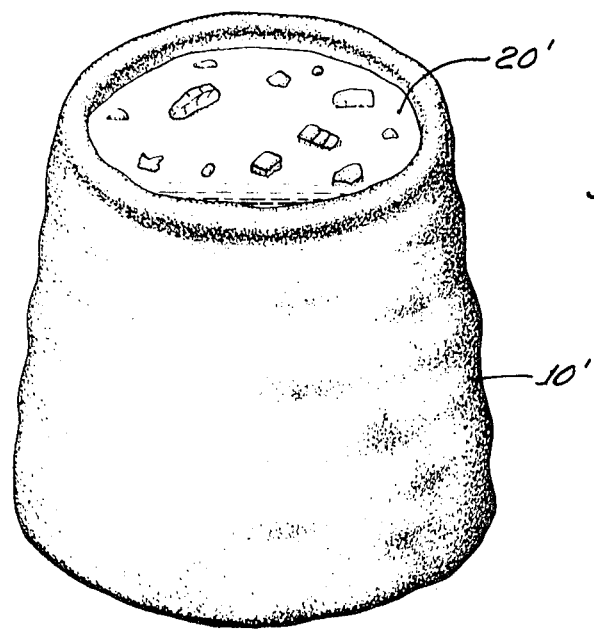

FIG. 4 illustrates the product of this invention prepared for serving, simply by lifting the cylinder 14 out of the annular crust 10'. The cylinder is disposed of and the baked patty shell is ready for being served hot or it may be chilled and served cold.

Figure 5:
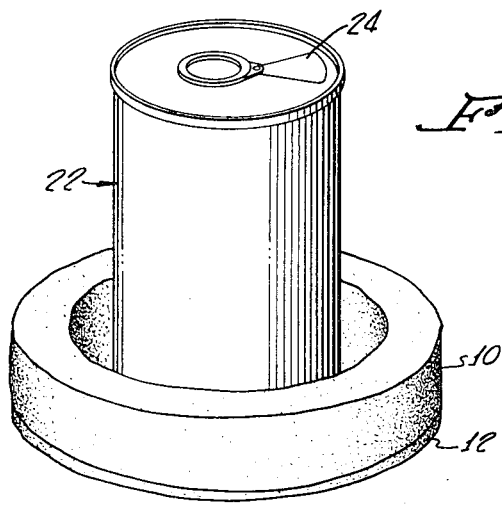
FIGS. 5, 6 and 7 illustrate an alternative and preferred embodiment of the invention.
Figure 6:
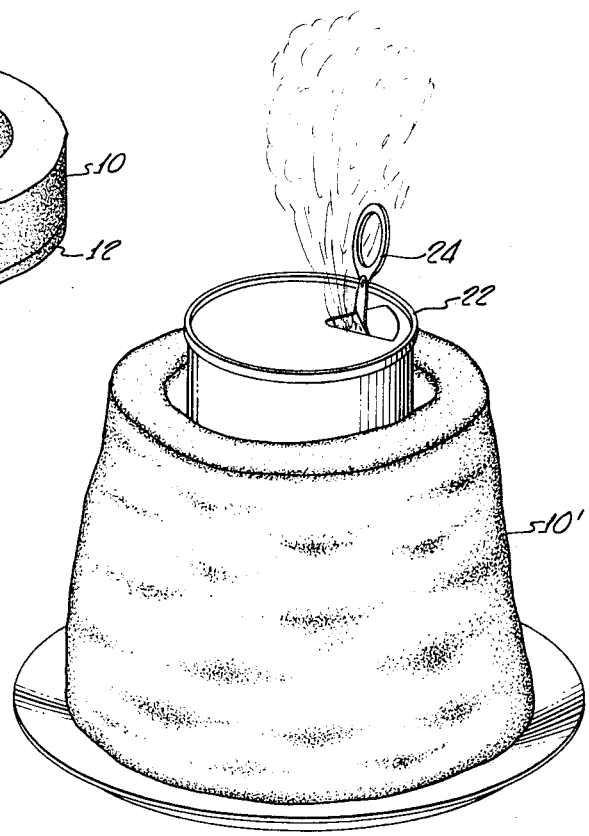
Figure 7:
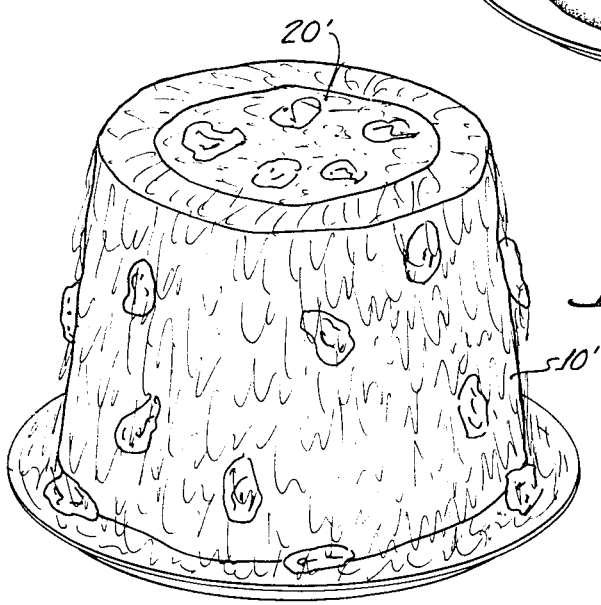

In the presently preferred embodiment of the invention, as illustrated in FIGS. 5, 6 and 7, the pastry is formed of an annular portion 10 and a bottom 12, as in the previous embodiment. The filling is packaged, however, in a conventional can shown generally at 22. The can may be of tin plated steel or of aluminum and may be provided with a pull-type opener, not shown, for opening substantially all of the bottom of the container and with a pull-tab 24, illustrated in FIGS. 5 and 6, in the top of the can. The pull opener and pull tab are of conventional design. Both the bottom opener and top tab may be omitted, however, in which case the bottom would be opened with a conventional can opener and the user would puncture the top to permit the escape of steam from the container during baking.

As illustrated in FIG. 7, it may be desirable to provide a pastry and a container of filling of such relative sizes that the filling overflows the baked patty shell to give a desired esthetic value to the product when it is served. Individual servings, using a 6-ounce can as the filling container, are very conveniently prepared in this manner to provide an epicurean delight.

The process of this invention is suitable for the preparing, handling, storing, marketing and baking of a great variety of pastries, the term pastry being used broadly to mean a product having a pastry crust with a filling. For convenience, the term fruit pastry is used to include not only fruit flavored pastries such as lemon, apple, and the like but berry, rhubarb and other sweet pastries. Also, for convenience, the term meat pastry as used herein is intended to encompass the conventional meat and meat-vegetable pastries and to include such diverse products as turkey and chicken pastries and such specialty products as Crab Newburg, Lobster Newburg, etc. The particular characteristics of the filling are of no consequence to the invention except insofar as it is necessary that the filling be capable of being solidified and baked.

Preferably, the filling is frozen and handled in combination with the pastry, according to the handling usually accorded frozen foods, and according to the preferred embodiment of this invention, both the filling and the pastry are frozen for handling.

In preparing the filling for combination into the product of this invention, the frozen filling is encased in a generally cylindrical heat resistant container, the container preferably having an open bottom. The filling is frozen in the cylindrical form and wrapped with the heat resistant material to form the container. Equivalently, the liquid pie filling may be poured into a container and frozen. In either case, the filling is referred to as being encased in the heat resistant container.

The container may have a closed top, but this is not required; however, the container should, in the preferred embodiment, have an open bottom. By an open bottom, I mean that foodstuff in the container rests upon the pastry bottom of the patty shell. A closure for the bottom may, obviously, be provided for handling, shipment, storage, etc., however. For example, a removable cap for the bottom may be provided. It is also convenient to encase the entire cylindrical body of frozen filling in aluminum foil, or other heat resistant material, provided with a score line, tear string, or other means for removing the bottom of the cylinder prior to use. For most convenient baking and handling by the consumer, however, the cylinder must have an open bottom when baked so as to permit withdrawal of the cylinder, following baking, from the baked pastry to permit the filling to fill the pastry and rest against the sides thereof. It is also desirable to provide a small opening in the top of the container to permit escape of steam during baking.

In a less convenient embodiment of the invention, the filling may be encased in a cylinder which includes a bottom. The product and process of the invention are the same in the essential respects but it is necessary for the consumer to withdraw the entire package of filling from the crust after baking and pour the filling from the container back into the crust. While this process is equivalent in some respects it is clearly less convenient than the preferred embodiment of this invention.

As previously indicated, the container must be formed of a heat resistant material so as to withstand ordinary baking temperatures. The preferred material, with respect to economy and convenience, is a conventional tin can. In carrying out the process, the filling is frozen or otherwise solidified in the can, or it may be frozen in the desired form and wrapped with the aluminum foil, to encase the filling in the cylindrical form. Other metals, such as tin foils, would be regarded as equivalent though perhaps less convenient. Non-metals, such as heat resistant plastics may also be used but these materials are generally less convenient and offer no particular advantage insofar as economy is concerned. If the baking temperature of the pastry is not too high, heat resistant treated paper or container board may be used to encase the pie filling. Paper and related material usually tend to char at higher temperatures and are less effective as moisture and moisture vapor barriers than tin or aluminum cans or aluminum foil, however, and are, therefore, less satisfactory generally. Any other heat resistant material, flexible or rigid, which is compatible with heated food, such as glass, may be used but no particular advantage for other materials is known.

The term cylindrical, or generally cylindrical, is used in the specification in the broad sense to describe those configurations which have an axis extending from top to bottom and a generally curved exterior surface. This would, of course, include the right cylinder, but would also include other curved shapes such as elliptical shapes and such ornamental configurations as heart shapes, etc. Generally speaking, sharp corners should be avoided since the crust does not tend to follow such contours readily. Insofar as this invention is concerned, however, the shape of the encasement for the pie filling is of little consequence. Desirably, it is sufficiently curved to permit the pastry to follow its general contours.

Puff pastry is preferred but other heat rising pastry may be used in this invention. A preferred puff pastry may, for example, include flour, water, eggs, cream of tartar and shortening. The pastry is handled in the conventional manner, insofar as forming it in the annular configuration is concerned, and may be shaped by rolling, cutting, etc. Typically, the pastry is rolled to any desired thickness for handling and cut into a circle to form the bottom and into a plurality of annular rings which, when stacked one on top another, provide the side construction of the pastry. In the formation of decorative shapes, the same procedure is followed with the exception that the rolled dough is cut into the desired shape for the bottom and into annulus-like figures of similar shape for the sides. Puff pastry of the type described in the American Baker's Institute Handbook and, for example, in The Art of French Cooking, English translation of the 1962 edition, available from Golden Press, Inc., New York is suitable.

The frozen pies and baked products of this invention can be made in almost any size. Overall diameters of from 1 inch to 12 inches, for example, are easily obtainable. Larger diameters can be prepared if need arises. In the formation of the pastry portion of the product of the invention, cross-rolled "puff" pastry comprising a great multiplicity of alternate layers of shortening and flour mixture, are cut to the desired dimensions. The thickness of the bottom of the annular patty shell is not critical except that too great a thickness leads to undesirable rising of the bottom and causes some problems in maintaining the cylinder in proper position. Rising can, of course, be limited by puncturing or compressing the shell at a plurality of points.

In general, bottom layer thicknesses for the annular patty shell in the range of 1/16 inch to ¼ inch are suitable. Thicknesses in the order of ⅛ inch are preferred. The width of the annular portion of the patty shell is subject to great variation. The widths of these annular rings, which are stacked to form the annular portion either before or after cutting, may be from about ⅛ inch to greater than 1 inch. Generally speaking, widths of from about ¼ inch to about ½ inch are suitable for most purposes. Wider annulus rings may be formed if a greater amount of pastry, with respect to the amount of filling, is desired in the end product. Generally speaking, the puff pastry used in this invention raises from about two to three times the original height during baking. Considerable variations can be achieved depending upon the composition and type of pastry and the baking conditions. Baking temperatures of from about 400° to 450° F. are common, while baking time depends upon the size of the pastry and amount of filling.

In one preferred embodiment, a patty shell is formed of dough so as to have an overall diameter of 3¼ inches, with an annular member width of ¼ inch and an annular height of ¾ inch, before baking, in addition to the thickness of the bottom which is ⅛ inch. A cylinder of frozen Crab Newburg or Lobster Newburg about 2¼ inches in diameter is placed upright with its open end downward in the center of the annulus supported by the bottom layer covering the end of the annulus. The product of the invention is then baked under conventional baking conditions and procedures, e.g., at 425° F. for 35 to 40 minutes, to produce the desired end product. The cylinder is simply lifted out, following baking, and the Lobster Newburg or Crab Newburg is served hot.

As illustrated, a space may be provided between the cylinder wall and the patty shell annulus. The patty shell may also be baked in contact with a greased cylinder, or if the pastry contains sufficient shortening, the cylinder need not be greased. When the patty shell is baked alone, it may tend to rise unevenly, move to one side, or even topple over. The presence of the can of filling in the center, whether in contact with the patty shell annulus or not, stabilizes the rising of the pastry to ensure a symetrical baked patty shell having the desired configuration and capacity. The spacing of the annulus from the cylinder may be a function of the volume of filling to be contained, but practice of the invention does not require spacing.

Some care must be exercised in cutting the pastry to form the annular configuration. If the cutter is sharp and, particularly, if the cut is made after the pastry is frozen, then the patty shell rises properly to form the desired baked configuration. If the cutter is dull and, especially, if the dough is warm during cutting, then the edges of the dough where it is cut tend to be crimped and fused together so that the layers of flour mixture are no longer separated by shortening layers. This results in incomplete and/or unequal rising during baking. Good pastry preparation technique, according to conventional practice, however, avoids problems in this area.

The following specific embodiment is given as illustrative and not by way of limitation of the invention.

LOBSTER OR CRAB NEWBURG

A Newburg sauce comprising butter oil, flour, Col Flo thickener, water, milk and cream, together with flavorings such as salt, monosodium glutamate, peppercream, clam base, lobster base, onion, paprika, tomato paste, chives, etc., is prepared by heating the liquid ingredients together, blending the butter oil and flavorings separately and then combining the oil-flavoring phase with the liquid phase. The sauce is cooled and blended in a 3 to 2 volume ratio with chunks of lobster. Crab chunks may be substituted for Crab Newburg. The blended filling is frozen and encased in aluminum foil or in a can with one end removed.

The pastry is made, for example, by sifting 6 pounds of bread flour and ¾ ounce of cream of tartar together and blending the dry mixture with 1 pound of butter or margarine. This mixture is then blended with 8 ounces of whole eggs and about 2 pounds 8 ounces of water and chilled. The chilled dough is "rolled in" with 4 pounds 8 ounces of margarine, in the conventional manner for preparing puff pastry. A large number of alternate layers of dough and margarine are formed which, upon rising, forms a very light, flaky pastry. The pastry dough is cut into one circle of about ⅛ inch thickness for the bottom crust and into a stacked ring annulus of about ¾ inch which is positioned around the outer edge of the circle. The annulus is frozen, in the preferred embodiment, for handling and distribution.

The article of manufacture of this invention then comprises the combination of the frozen encased filling and the frozen annular pastry, which may be held in the proper baking relationship or in any other convenient relationship for packaging. The consumer simply places the article of manufacture in a preheated oven, with the encased filling in the center of the annular pastry, and bakes it for a predetermined time, e.g., at 425° F. for 35 minutes. The cylinder is lifted out and the Lobster Newburg is ready for serving.

Meat pastry, of the type exemplified, is usually served hot. Fruit pastry, however, may be served hot or may be chilled before serving. Fruit or berry tarts, for example, would normally be cooled before serving. Obviously, a great deal of variation in the type of pastry and the type of filling used as well as the size and configuration of the product is possible without departing from the scope of the invention as defined in the claims which follow.

I claim:

1. As an article of manufacture, a food product suitable for storage and baking comprising the combination of an unbaked patty shell formed of heat rising dough in a generally annular configuration having a bottom layer for forming an annular side crust and bottom crust when baked; a generally cylindrically shaped body of solidified food filling; and a heat and moisture resistant cylinder encasing the solidified filling and having means at the top for allowing steam to escape and having an open bottom, said cylinder being positioned proximate the center of the annular patty shell during baking to provide shaping for the rising dough of the patty shell and prevent the filling from resting in contact with the sides of the patty shell during baking, and whereby after baking the cylinder can be removed to allow the filling to be deposited in the shell.

2. The article of manufacture of claim 1 wherein the cylinder is made of metal.

3. The article of manufacture of claim 1 wherein the patty shell and filling are frozen.

4. The article of manufacture of claim 1 wherein the heat and moisture resistant cylinder is a metal cylinder having a substantially closed top and the patty shell and filling are frozen.

5. The article of manufacture of claim 4 wherein prior to baking the cylinder is significantly smaller than the inside of the annular patty shell such that a space exists between the outside of the cylinder and the inside of the annular patty shell.

6. A process for preparing a baked food product comprising the steps of:
    forming a patty shell of heat rising dough in a generally annular configuration having a bottom;
    encasing a solidified food filling in a generally cylindrical heat resistant container having an open bottom;
    positioning the container of filling vertically proximate the center of the patty shell;
    baking the patty shell with the container of filling in said position; and
    removing the container from the baked patty shell and causing the filling to flow through the open bottom and be deposited in said baked patty shell against the baked sides of the patty shell.

7. The process of claim 6 further comprising the steps of freezing said patty shell for storage and handling prior to baking of said food product and wherein said filling is frozen.

8. The process of claim 7 wherein said container is made of metal.

9. The process of claim 8 wherein said container is made of metal foil.

10. The process of claim 6 further comprising the steps of freezing said patty shell for storage and handling prior to baking of said food product and wherein said filling is frozen.

11. The process of claim 6 further comprising the step of opening the top of the container to form a steam vent during baking.

12. A process for preparing a baked food product comprising the steps of:
    positioning a generally cylindrical container of solidified food filling proximate the center of a patty shell which comprises a bottom and generally annular sides formed of heat rising dough, said container having an open bottom;
    baking the patty shell with the container in said position; and
    removing the container from the baked patty shell thereby causing the filling to be deposited in said baked patty shell and against the sides of the patty shell.

13. The process of claim 12 wherein said container is formed of metal foil and wherein said filling is fruit filling or meat filling and the dough is a puff pastry dough.

14. The process of claim 12 further comprising the step of opening the top of the container to form a steam vent during baking.

* * * * *